(12) United States Patent
Aslam et al.

(10) Patent No.: US 9,727,524 B2
(45) Date of Patent: Aug. 8, 2017

(54) REMOTE DIRECT MEMORY ACCESS (RDMA) OPTIMIZED HIGH AVAILABILITY FOR IN-MEMORY DATA STORAGE

(71) Applicant: International Business Machines Corporation, Armonk, NY (US)

(72) Inventors: Muhammad Sohaib Aslam, Ajax (CA); Steve Langridge, Markham (CA); Tiia Salo, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/709,600

(22) Filed: May 12, 2015

(65) Prior Publication Data

US 2016/0117283 A1    Apr. 28, 2016

Related U.S. Application Data

(63) Continuation of application No. 14/525,207, filed on Oct. 27, 2014.

(51) Int. Cl.
| | |
|---|---|
| *G06F 15/167* | (2006.01) |
| *H04L 29/08* | (2006.01) |
| *G06F 3/06* | (2006.01) |
| *H04L 29/12* | (2006.01) |
| *G06F 15/173* | (2006.01) |

(52) U.S. Cl.
CPC ............ *G06F 15/167* (2013.01); *G06F 3/061* (2013.01); *G06F 3/067* (2013.01); *G06F 3/0655* (2013.01); *H04L 67/10* (2013.01); *H04L 67/1097* (2013.01); *G06F 15/17331* (2013.01); *H04L 61/25* (2013.01)

(58) Field of Classification Search
CPC ........ G06F 15/167; G06F 3/067; G06F 3/061; G06F 3/0655; G06F 15/17331; H04L 67/1097; H04L 67/10; H04L 61/25
USPC ......................................................... 709/212
See application file for complete search history.

(56) References Cited

U.S. PATENT DOCUMENTS

| | | | |
|---|---|---|---|
| 7,787,383 B2 | 8/2010 | Bali et al. | |
| 8,627,136 B2 | 1/2014 | Shankar et al. | |
| 9,317,536 B2* | 4/2016 | Sirer | G06F 17/30283 |
| 2012/0166886 A1* | 6/2012 | Shankar | G06F 11/2028 |
| | | | 714/43 |

(Continued)

*Primary Examiner* — Tauqir Hussain
*Assistant Examiner* — Michael A Keller
(74) *Attorney, Agent, or Firm* — Steven M. Greenberg, Esq.; CRGO Law

(57) ABSTRACT

A method for RDMA optimized high availability for in-memory storing of data includes receiving RDMA key-value store write requests in a network adapter of a primary computing server directed to writing data to an in-memory key-value store of the primary computing server and performing RDMA write operations of the data by the network adapter of the primary computing server responsive to the RDMA key-value store write requests. The method also includes replicating the RDMA key-value store write requests to a network adapter of a secondary computing server, by the network adapter of the primary computing server. Finally, the method includes providing address translation data for the in-memory key-value store of the primary computing server from the network adapter of the primary computing server to the network adapter of the secondary computing server.

3 Claims, 2 Drawing Sheets

(56) References Cited

U.S. PATENT DOCUMENTS

2014/0047263 A1   2/2014  Coatney et al.
2015/0169223 A1*  6/2015  Srikantaiah ......... G06F 12/1081
                                                711/147
2015/0261720 A1*  9/2015  Kagan ................. G06F 13/4221
                                                710/308

* cited by examiner

REMOTE DIRECT MEMORY ACCESS (RDMA) OPTIMIZED HIGH AVAILABILITY FOR IN-MEMORY DATA STORAGE

BACKGROUND OF THE INVENTION

Field of the Invention

The present invention relates to the in-memory storage of data in an application server and more particularly to supporting high availability while storing application related data in-memory in an application server.

Description of the Related Art

An application server is a software system executing upon a hardware platform that exposes business logic to client applications through various protocols such as the hypertext transfer protocol (HTTP). While a Web server mainly support the transmitting of hypertext markup language (HTML) defined pages to requesting browser clients for display in a browser, an application server provides access to business logic for use by client application programs. In this regard, the application program can use supplied business logic just as it would call a method on an object internally disposed on a supporting client device.

In most cases, an application server exposes its business logic through a component application programming interface (API) and the application server manages its own resources. Therefore, the application server also provides gate-keeping services including security, transaction processing, resource pooling, and messaging. The application server also must provide performance-enhancing services such as an in-memory store. Finally, like a Web server, an application server may also support scalability and fault-tolerance including high availability.

Advanced application servers provides for in-memory storing of data to support lightning fast data access. In-memory storing can be provided globally to all logic resources of the application server, or at the container level so as to support only a subset of the instances of logic resources in the application server. Recent advances in in-memory stores for application servers utilize direct memory access (DMA) techniques. One such technique includes remote DMA. In computing, remote direct memory access (RDMA) is a direct memory access from the memory of one computer into that of another without involving either one's operating system.

Thus, RDMA permits high-throughput, low-latency networking, which is especially useful in massively parallel computer clusters. RDMA supports zero-copy networking by enabling the network adapter to transfer data directly to or from application memory, eliminating the need to copy data between application memory and the data buffers in the operating system. Such transfers require no work to be done by the central processing units (CPUs), key-value stores, or context switches, and transfers continue in parallel with other system operations. When an application performs an RDMA Read or Write request, the application data is delivered directly to the network, reducing latency and enabling fast message transfer.

Distributed key/value pair store systems that exploit one-sided RDMA such as those found in an in-memory store engine of an application server can directly read from and write to the server's memory. This direct memory access is performed by utilizing RDMA between the network adapter of the server and the memory of the server without involving the CPU or CPUs of the server. Consequently, ultra high throughput and ultra low latency results. However, high availability remains an important problem for one-sided RDMA access. Because the server processor is not involved there are no software-level hooks for high availability replication, which leaves the key-value store vulnerable to hardware failures. Further, involving the server processor even minimally can cause dramatic performance degradation, measured in millions of requests per second. Therefore software-based high availability schemes are undesirable when seeking performance through RDMA supported in-memory stores.

BRIEF SUMMARY OF THE INVENTION

Embodiments of the present invention address deficiencies of the art in respect to in-memory stores in an application server and provide a novel and non-obvious method, system and computer program product for RDMA optimized high availability for in-memory storing. In an embodiment of the invention, a method for RDMA optimized high availability for in-memory storing of data is provided. The method includes receiving RDMA key-value store write requests in a network adapter of a primary computing server directed to writing data to an in-memory key-value store of the primary computing server and performing RDMA write operations of the data by the network adapter of the primary computing server responsive to the RDMA key-value store write requests. The method also includes replicating the RDMA key-value store write requests to a network adapter of a secondary computing server, by the network adapter of the primary computing server. Finally, the method includes providing address translation data for the in-memory key-value store of the primary computing server from the network adapter of the primary computing server to the network adapter of the secondary computing server.

In one aspect of the embodiment, in response to a determination that the primary computing server has failed, an RDMA key-value store read request is received from a requesting client in the network adapter of the secondary computing server in respect to data stored in the in-memory key-value store of the primary computing server. Thereafter, because there are no guarantees that the data in the primary and secondary computing servers are written into the same address in both servers, an address for the data stored in the in-memory key-value store of the primary computing server is translated to an address in an in-memory key-value store of the secondary computing server utilizing the address translation data and an RDMA key-value store read operation is performed at the translated address. Finally, the data produced by the RDMA key-value store read operation is returned by the network adapter of the secondary computing server to the requesting client. Optionally, a local address table of the network adapter of the secondary computing server is translated based upon the address translation data all subsequent RDMA key-value store requests for data in the in-memory key-value store of the primary computing server are processed in the network adapter of the secondary computing server utilizing the translated local address table.

In another aspect of the embodiment, an RDMA key-value store update request is received in the network adapter of the primary computing server directed to data stored in the in-memory key-value store of the primary computing server. Thereafter, in response to the RDMA key-value store update request, an RDMA key-value store update operation is performed on the stored data by the network adapter of the primary computing server. As before, the RDMA key-value store update request is replicated to the network adapter of the secondary computing server, by the network adapter of the primary computing server and the addressing for the stored data in the in-memory key-value store of the primary computing server is translated to an address in an in-memory key-value store of the secondary computing server utilizing the address translation data. Finally, the stored data is updated in the in-memory key-value store of the secondary server utilizing the translated addressing.

In another embodiment of the invention, an application server data processing system is configured for RDMA optimized high availability for in-memory storing. The system includes a primary computing server with a corresponding in-memory key-value store and at least one processor and network adapter, and also a secondary computing server with a corresponding in-memory key-value store and at least one processor and a network adapter. The system also includes an RDMA optimized high availability module disposed in each of the network adapters. The module includes program code enabled to receive RDMA key-value store write requests in the network adapter of a primary computing server directed to writing data to the in-memory key-value store of the primary computing server, to perform RDMA write operations of the data by the network adapter of the primary computing server responsive to the RDMA key-value store write requests, to replicate the RDMA key-value store write requests to the network adapter of the secondary computing server, by the network adapter of the primary computing server, and to provide address translation data for the in-memory key-value store of the primary computing server from the network adapter of the primary computing server to the network adapter of the secondary computing server.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for RDMA optimized high availability for in-memory storing. In accordance with an embodiment of the invention, each RDMA key-value store write request received in a network adapter of a primary computing server to perform an RDMA write operation of data to an in-memory key-value store defined in the memory of the primary server, can be replicated to a network adapter of a secondary computing server. Further, address translation data for the in-memory key-value store of the primary computing server can be provided to the network adapter of the secondary computing server. In this way, during failover from the primary server to the secondary server, access to the data of the in-memory key-value store in the memory of the secondary server can continue as if it were the in-memory key-value store in the memory of the primary server without requiring intervention of the CPU of the primary server.

Figure 1:
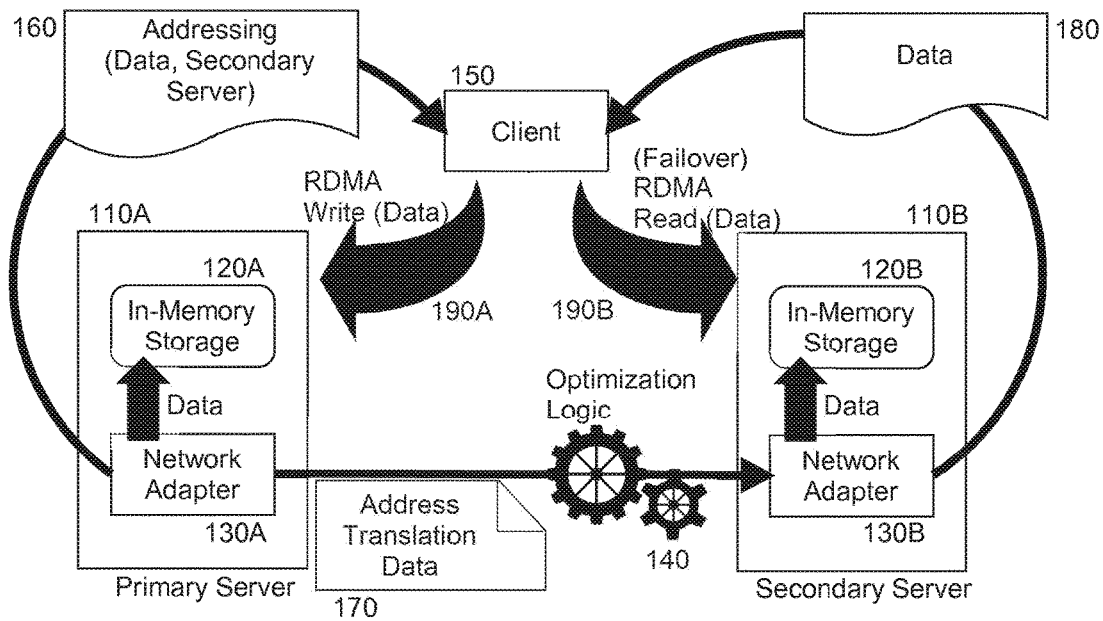
FIG. 1 is a pictorial illustration of a process for RDMA optimized high availability for in-memory storing.

In further illustration, FIG. 1 pictorially shows a process for RDMA optimized high availability for in-memory storing. As shown in FIG. 1, a primary server 110A can implement an in-memory key-value store 120A accessible through RDMA operations by a corresponding network adapter 130A. Likewise, a secondary server 110B can implement an in-memory key-value store 120B accessible through RDMA operations by a corresponding network adapter 130B. Optimization logic 140 can execute in the memory of the primary and secondary servers 110A, 110B. The optimization logic 140 can process RDMA requests from a coupled client 150, such as write, read and update.

Initially, the client 150 can issue an RDMA write request 190A to the primary server 110A to write data to the in-memory key-value store 120A. The optimization logic 140 can direct the network adapter 130A to perform the RDMA write operation for the data and the network adapter 130A can return addressing data 160 to the client 150, including an address of the data in the in-memory key-value store 120 and an address of the secondary server 110B. Further, the optimization logic 140 can replicate the RDMA write request 190A to the network adapter 130B along with address translation data 170 indicating the address in the in-memory key-value store 120A at which the data is stored. The optimization logic 140 in the secondary server 110B can process the replicated RDMA write request 190A and can determine a delta between the address translation data 170 and the address at which the data of the replicated RDMA write request 190A has been stored in the in-memory key-value store 120B.

Thereafter, RDMA update requests replicated by the optimization logic 140 from the network adapter 130A of the primary server 110A to the network adapter 130B of the secondary server 110B can be processed by translating the address of the RDMA update request utilizing the delta before directing an RDMA update for the data in the in-memory key-value store 120B. Of note, the client 150 can store a local hash map that for each key stored therein in respect to data stored in one of the servers 110A, 110B contains a remote pointer (i.e. address) to the data corresponding to the key in the primary server 110A. As such, the client upon failover to the secondary server 120 may access the in-memory key-value store 120B of the secondary server 110B directly using the remote pointers/addresses of the local hash map.

To that end, the client 150 repeatedly can issue to the primary server 110A RDMA read requests for data disposed at respective addresses of the primary server 110A. However, to the extent that the primary server 110A becomes non-responsive, the client 150 utilizing the address of the secondary server 110B can issue a failover RDMA read request 190B to the secondary server with the address of the requested data. The optimization logic 140 in turn can translate the address of the data to a corresponding address in the in-memory key-value store 120B utilizing the delta between addresses in the in-memory key-value store 120A and the in-memory key-value store 120B. Using the translated address the optimization logic 140 can direct the network adapter 130B to perform an RDMA read operation at the translated address and the network adapter 130B can return the retrieved data 180 at the translated address to the client 150. Optionally, a local translation table maintained in the client 150 can be translated in response to a failover with the delta so as to issue subsequent RDMA read requests and update requests to the secondary server 110 with an already translated address.

Figure 2:
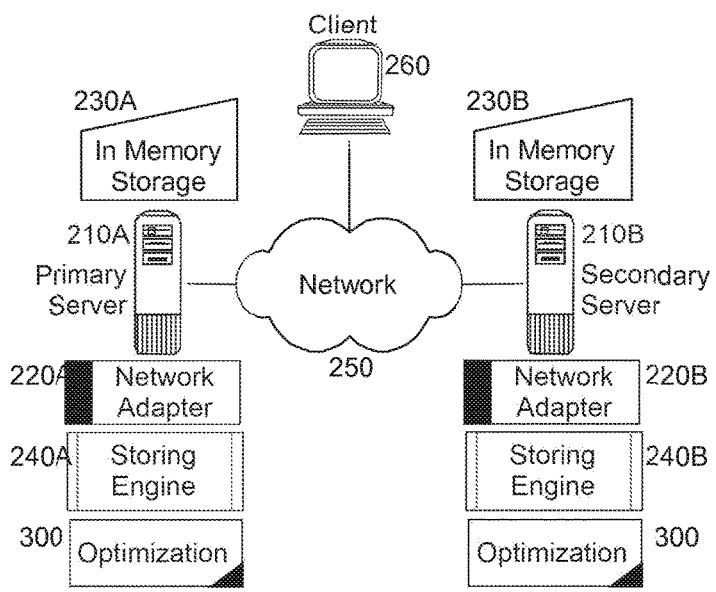
FIG. 2 is a schematic illustration of a application server data processing system configured for RDMA optimized high availability for in-memory storing; and, FIGS. 3A through 3D, taken together, are a flow chart illustrating a process for RDMA optimized high availability for in-memory storing.

The process described in connection with FIG. 1 can be implemented in an application server data processing system. In yet further illustration, FIG. 2 schematically shows an application server data processing system configured for RDMA optimized high availability for in-memory storing. The system includes primary and secondary application servers 210A, 210B coupled to one another over a computer communications network 250. The primary and secondary application servers 210A, 210B each include memory and at least one processor and also include respective network adapters 220A, 220B. The primary and secondary application servers 210A, 210B also include respective storing engines 240A, 240B managing correspondingly different in-memory key-value stores 230BA, 230B into which application server objects are key-value stored.

Importantly, an optimization module 300 can be included as part of the network adapter firmware of each of the application servers 210A, 210B. The optimization module 300 can include program code that when executed in the memory of the application servers 210A, 210B is enabled to receive an RDMA write request for data from a client 260. The program code further can be enabled to direct the network adapter 220A to perform an RDMA write operation in the in-memory key-value store 230A resulting in an address at which the data is stored in the in-memory key-value store 230A. The program code yet further can replicate the RDMA write request for the data to the network adapter 220B with the address such that the network adapter 220B can perform an RDMA write operation of the data into the in-memory key-value store 230 resulting in an address at which the data is stored in the in-memory key-value store.

Utilizing the address received from the optimization logic 300 of the network adapter 220A, the optimization logic 300 of the network adapter 220B can determine a delta between the addresses acting as address translation data. Finally, the program code can return not only the address of the data in the in-memory key-value store 230A to the client, but also the program code can return to the client 260 the address of the secondary application server 210B in the event of a failure of the primary application server 210A. In this regard, in response to a failure of the primary application server 210A, the client 260 can issue an RDMA read request to the secondary application server 210B with the address of the sought after data in the in-memory key-value store 230A. Using the delta, the network adapter 220B can translate the address to a valid address in the in-memory key-value store 230B and the network adapter 220B can retrieve the sought after data in the in-memory key-value store 230B.

In even yet further illustration of the operation of the optimization module 300, FIGS. 3A through 3D, taken together, are a flow chart illustrating a process for RDMA optimized high availability for in-memory storing. Beginning in block 305, an RDMA write request for data can be received from a client in a network adapter of a primary computing server and in block 310, the RDMA write request can be replicated to a network adapter of a secondary computing server. In block 315, an RDMA write operation can be performed by the network adapter of the primary computing server on the data resulting in an address of storage of the data in the in-memory key-value store of the primary computing server. In block 320, the address can be retrieved and in block 325 the address can be provided to the network adapter of the secondary computing server with which the network adapter of the secondary computing server can compute a delta between the addresses in the in-memory key-value store of the primary computing server and those of the secondary computing server. Finally, the address of the data and an address of the secondary computing server can be returned to the requesting client.

Figure 3A:
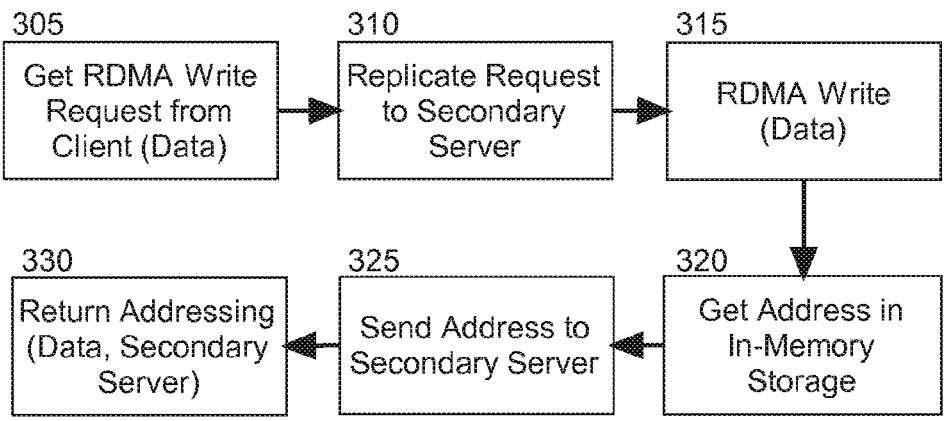
Figure 3B:
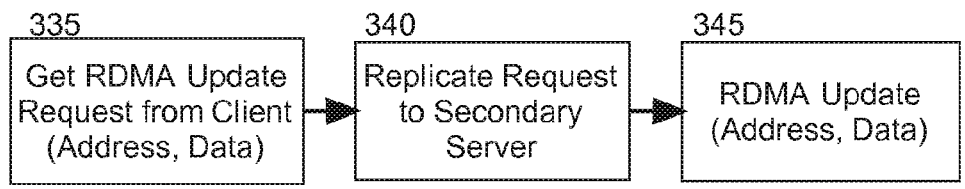

Turning now to FIG. 3B, an RDMA update request an be received in the network adapter of the primary computing server in block 335 an RDMA update request specifying an update of data at a specified address can be received in the network adapter of the primary computing server. In block 340 the update request can be replicated to the network adapter of the secondary computing server in response to which the network adapter of the secondary computing server can update data at the address provided adjusted to account for the delta. Likewise, in block 345 the network adapter of the primary computing server can perform an RDMA update of the data at the specified address.

Figure 3C:
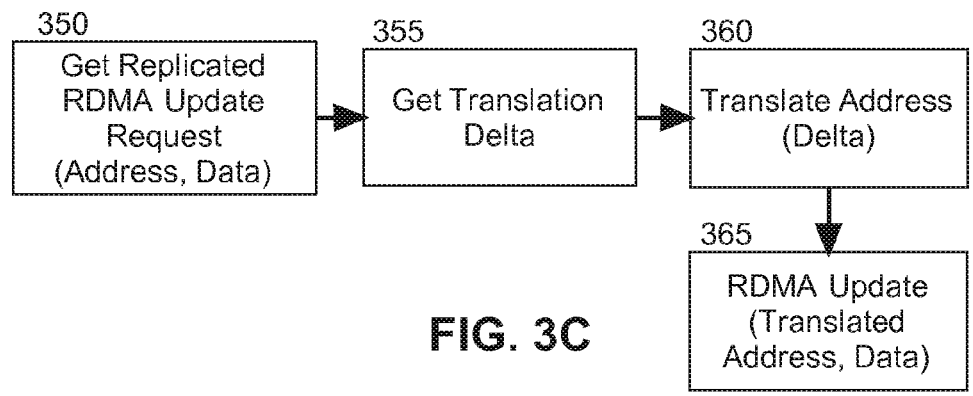

In this regard, as shown in FIG. 3C, at block 350 the replicated RDMA update request can be received in the network adapter of the secondary computing server along with an address in the in-memory key-value store of the primary computing server at which the data to be updated can be located. In block 355 the translation delta previously computed by the network adapter of the secondary computing server can be retrieved and in block 360 the received address can be translated to an address of the in-memory key-value store of the secondary computing server. Finally, in block 365 an RDMA update operation can be performed by the network adapter of the secondary computing server on data at the translated address.

Figure 3D:
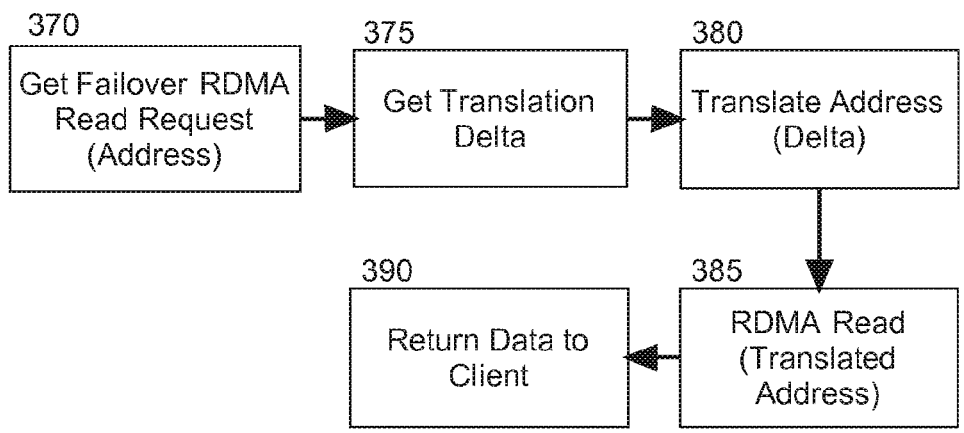

Referring now to FIG. 3D, in block 370 a failover RDMA read request can be received from the client at the network adapter of the secondary computing server. IN block 375, the translation delta previously computed can be retrieved and applied to the address of the RDMA read request at block 380. Subsequently, in block 385 the network adapter can perform an RDMA read operation at the translated address. Finally, data retrieved from the in-memory key-value store of the secondary computing server resulting from the RDMA read operation can be returned to the client in block 390.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A method for remote direct memory access (RDMA) optimized high availability for in-memory storing of data, the method comprising:

receiving RDMA key-value store write requests in a network adapter of a primary computing server directed to writing data to an in-memory key-value store storing associative arrays of data of the primary computing server each associative array including a key associated with a single value;

performing RDMA write operations of the data by the network adapter of the primary computing server responsive to the RDMA key-value store write requests;

replicating the RDMA key-value store write requests to a network adapter of a secondary computing server, by the network adapter of the primary computing server;

providing from the network adapter of the primary computing server to the network adapter of the secondary computing server, address translation data indicating the address in the in-memory key-value store of the primary computing server at which the data is stored;

receiving an RDMA key-value store update request in the network adapter of the primary computing server directed to data stored in the in-memory key-value store of the primary computing server;

performing an RDMA key-value store update operation on the stored data by the network adapter of the primary computing server responsive to the RDMA key-value store update request;

replicating the RDMA key-value store update request to the network adapter of the secondary computing server, by the network adapter of the primary computing server;

translating addressing for the stored data in the in-memory key-value store of the primary computing server to an address in an in-memory key-value store of the secondary computing server utilizing the address translation data; and, updating the stored data in the in-memory key-value store of the secondary server utilizing the translated addressing.

2. The method of claim 1, further comprising:

receiving from a requesting client an RDMA key-value store read request in the network adapter of the secondary computing server in respect to data stored in the in-memory key-value store of the primary computing server;

translating an address for the data stored in the in-memory key-value store of the primary computing server to an address in an in-memory key-value store of the secondary computing server utilizing the address translation data;

performing an RDMA key-value store read operation at the translated address; and, returning by the network adapter of the secondary computing server the data produced by the RDMA key-value store read operation to the requesting client.

3. The method of claim 2, further comprising:

translating a local address table of the client based upon the address translation data; and, forwarding all subsequent RDMA key-value store requests for data in the in-memory key-value store of the primary computing server to the network adapter of the secondary computing server utilizing the translated local address table.

* * * * *